(12) United States Patent
Lee et al.

(10) Patent No.: US 10,608,563 B2
(45) Date of Patent: Mar. 31, 2020

(54) DRIVING CONTROL DEVICE FOR VOICE COIL MOTOR AND METHOD OF USING THE SAME

(71) Applicant: DONGWOON ANATECH CO., LTD., Seoul (KR)

(72) Inventors: Seung Kwon Lee, Seoul (KR); Sun Pyo Lee, Seoul (KR); Ho Jun Lee, Seoul (KR); Sin Won Cho, Seoul (KR)

(73) Assignee: DONGWOON ANATECH CO., LTD., Seoul (KR)

( * ) Notice: Subject to any disclaimer, the term of this patent is extended or adjusted under 35 U.S.C. 154(b) by 564 days.

(21) Appl. No.: 15/306,361

(22) PCT Filed: Jun. 30, 2016

(86) PCT No.: PCT/KR2016/007074
§ 371 (c)(1),
(2) Date: Oct. 24, 2016

(87) PCT Pub. No.: WO2018/004037
PCT Pub. Date: Jan. 4, 2018

(65) Prior Publication Data
US 2018/0205333 A1 Jul. 19, 2018

(51) Int. Cl.
*H02P 25/02* (2016.01)
*H02K 33/18* (2006.01)
(Continued)

(52) U.S. Cl.
CPC ............... *H02P 7/025* (2016.02); *G02B 7/04* (2013.01); *G03B 13/34* (2013.01); *H02K 41/0356* (2013.01)

(58) Field of Classification Search
CPC ........... H02K 15/00; G02B 3/14; G03B 17/14
See application file for complete search history.

(56) References Cited

U.S. PATENT DOCUMENTS

| 2009/0102403 | A1 | 4/2009 | Lule .............................. 318/135 |
| 2012/0200763 | A1 | 8/2012 | Ninomiya ..................... 348/345 |
| 2013/0169857 | A1* | 7/2013 | Christo ............. H04N 5/23212 348/349 |

FOREIGN PATENT DOCUMENTS

| CN | 101153951 A | 4/2008 |
| CN | 101378240 A | 3/2009 |

(Continued)

OTHER PUBLICATIONS

Chinese Mater's Theses Full-Text Database Information Science and Technology, published on Mar. 15, 2015.
(Continued)

*Primary Examiner* — Bickey Dhakal
*Assistant Examiner* — Charles S Laughlin
(74) *Attorney, Agent, or Firm* — Stein IP, LLC (57) ABSTRACT

The present invention relates to a driving control of a voice coil motor (hereinafter, referred to as 'VCM') which moves lens of a camera module, more particularly to a driving control method for VCM capable of reducing the noise generated at the time of initial driving or landing of the lens and reducing the moving time thereof, and the method is characterized by and include the steps of: applying a linearly increasing current with a first slope to the VCM up to a pre-set first inflection point in response to a camera operation-on command; and moving the lens to an infinite position by applying a linearly increasing current with a second slope less steep than the first slope to the VCM from the first inflection point to the infinite position.

14 Claims, 10 Drawing Sheets

(51) Int. Cl.
*H02K 1/34* (2006.01)
*H02P 7/025* (2016.01)
*G02B 7/04* (2006.01)
*G03B 13/34* (2006.01)
*H02K 41/035* (2006.01)

(56) References Cited

FOREIGN PATENT DOCUMENTS

KR   10-2006-0080821 A   7/2006
KR   10-2015-0063333 A   6/2015

OTHER PUBLICATIONS

Chinese Office Action dated Dec. 5, 2019, issued to Chinese Application No. 201680001222.2.

* cited by examiner

| LSC step delay | 60us | | 160us | |
|---|---|---|---|---|
| ITEM | Noise Level | Operation time | Noise Level | Operation time |
| CASE1 | 29.3 dB | 43.0 ms | 29.8 dB | 67.8 ms |
| CASE2 | 37.8 dB | 43.0 ms | 40.8 dB | 68.2 ms |
| CASE3 | 32.9 dB | 34.6 ms | 33.9 dB | 54.4 ms |
| CASE4 | 45.1 dB | 34.6 ms | 45.6 dB | 54.4 ms |
| CASE5 | 36.7 dB | 26.0 ms | 38.3 dB | 41.0 ms |
| CASE6 | 50.0 dB | 26.0 ms | 51.7 dB | 41.0 ms |

| LSC step delay | 60us | | 160us | |
| --- | --- | --- | --- | --- |
| Test Sequence | Noise Level | Operation time | Noise Level | Operation time |
| CASE1 | 32.2 dB | 46.4 ms | 26.7 dB | 73.2 ms |
| CASE2 | 30.5 dB | 46.4 ms | 29.3 dB | 73.2 ms |
| CASE3 | 34.4 dB | 39.6 ms | 27.0 dB | 62.2 ms |
| CASE4 | 29.2 dB | 39.6 ms | 30.7 dB | 62.2 ms |
| CASE5 | 34.4 dB | 32.8 ms | 27.5 dB | 51.4 ms |
| CASE6 | 28.8 dB | 32.8 ms | 29.7 dB | 51.4 ms |

✓ White Noise : 26~28dB

DRIVING CONTROL DEVICE FOR VOICE COIL MOTOR AND METHOD OF USING THE SAME

CROSS-REFERENCE TO RELATED APPLICATIONS

This application is a national stage of International Application No. PCT/KR2016/007074, filed Jun. 30, 2016 in the Korean Intellectual Property Office. All disclosures of the document named above are incorporated herein by reference.

TECHNICAL FIELD

The present invention relates to a driving control of a voice coil motor (hereinafter, referred to as 'VCM') which moves lens of a camera module, more particularly to a driving control device and a driving control method for VCM capable of reducing the noise generated at the time of initial driving or landing of the lens and reducing the moving time thereof.

BACKGROUND ART

In a mobile IT device such as a digital camera, a camera module is embedded therein for making a video or capturing a picture. In such a camera module, a VCM is provided as a means for moving the lens in order to make a focus on the object.

Figure 1:
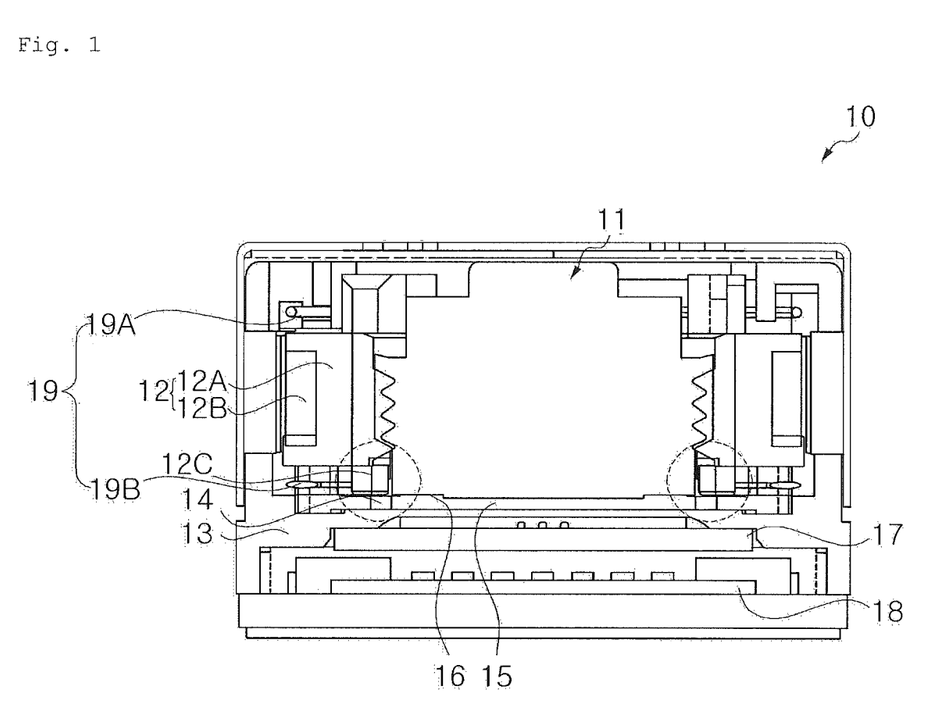
FIG. 1 is an exemplary view of a cross-section of a general camera module adopting a VCM.

As illustrated in FIG. 1, a VCM actuator 12 coupled to the side surface of the lens 11 is located in the upper side of a bobbin support 14 of the housing 13.
The VCM actuator 12 comprises a permanent magnet 12B and a bobbin 12A.

The power supply of the camera becomes off when the mode is converted from the operating mode to the camera stop mode in the camera module 10 having the above described structure.

In this case, the bobbin 12A moves the lens 11 to the bottom surface 16 due to the force of a spring 19. In this way, when the lens 11 is moved to the bottom surface 16 noise is generated caused by the collision between the lower portion 12C of the bobbin 12A and the bobbin support 14 of the housing 13. Such noise is called allophone of a VCM.

A technique is also introduced in that in order to suppress such noise, the current applied to the VCM is not off when the mode is switched from the operating mode to the camera stop mode, but rather linearly reduced, the noise generated by the collision between the lower portion 12C of the bobbin 12A and the bobbin support 14 of the housing 13 is minimized thereby. However, although such technique is a method which can minimize the VCM noise, it is disadvantageous in that more time is required for the lens to be moved to the bottom surface since the applied current to the VCM is linearly reduced.

Figure 2:
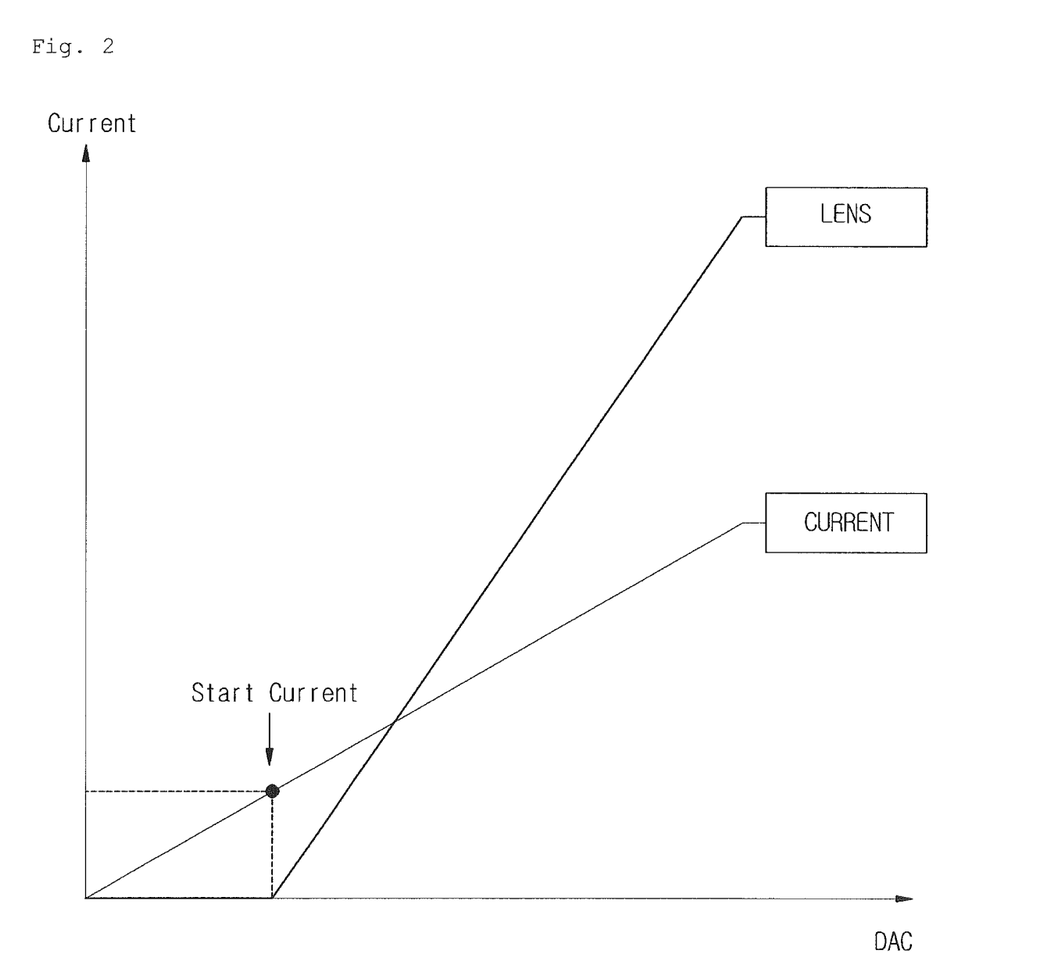
FIG. 2 is an exemplary graph plotting the current applied to the VCM for initial driving of the lens versus the displacement of the lens.

Also, a linearly increasing current is applied to the VCM in the initial stage for moving the lens as illustrated in FIG. 2, and the noise is generated by the deformation of the spring when the lens starts to move or start to stop due to the initial driving current, the elastic coefficient of spring, a stop friction, and the like. Thus, there is a necessity for removing or minimizing the noise caused by the current applied to VCM in the initial stage of driving the lens.

Figure 3:
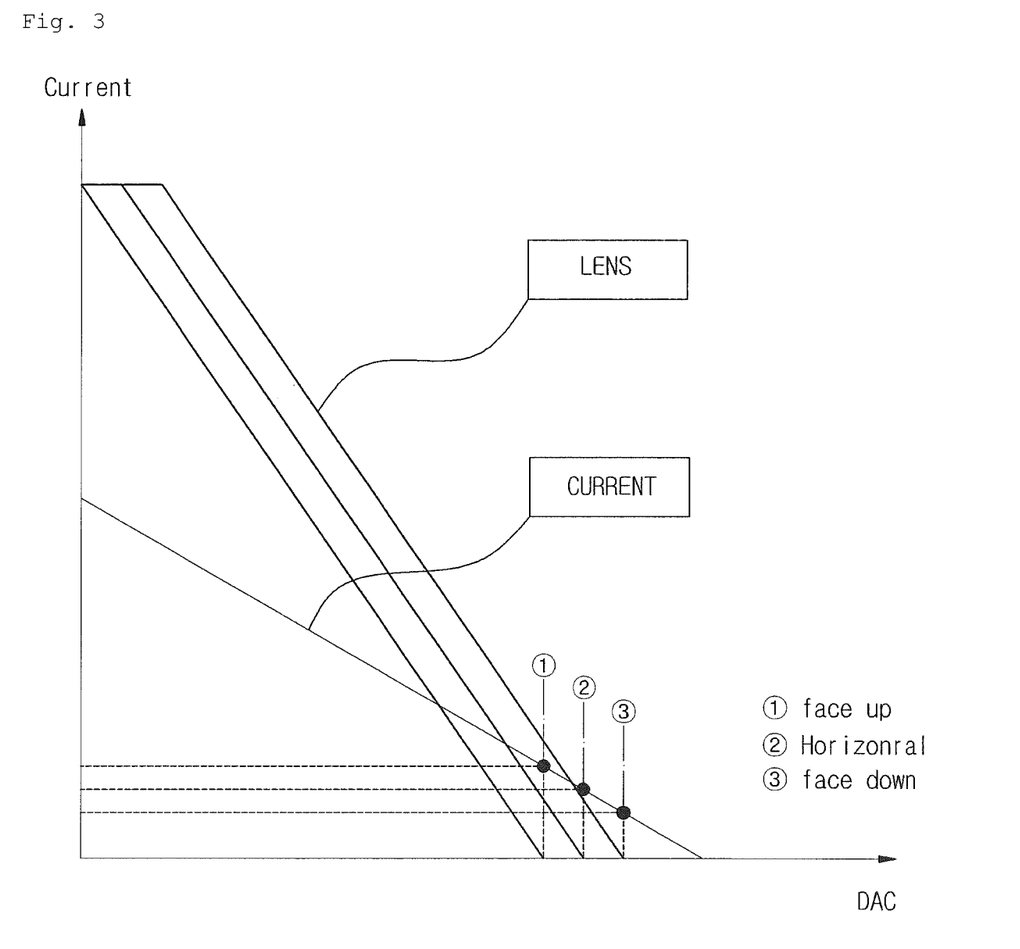
FIG. 3 is an exemplary graph plotting the current applied to the VCM for returning the lens to the landing position versus the displacement of the lens.

For reference, FIG. 2 illustrates the current applied to the VCM for initial driving of the lens and the displacement of the lens, and FIG. 3 illustrates the current applied to the VCM for returning the lens to the landing area and the displacement of the lens. Especially in FIG. 3, the displacement of the lens is separately presented according to the pose of the camera module, that is, face up, horizontal, and face down. Referring to FIG. 3, it can be seen that the lens is returning to the landing area at different current values depending on the position of the camera module. In addition, since the 'start current' in FIG. 2 is a current applied to the VCM when the lens starts to start, hereinafter in the following description, it will be referred to as 'start current' that is applied to the VCM at the time when the lens starts to move.

LEADING TECHNICAL LITERATURES

Patent Literature

[Patent Literature 1] US Patent Publication No. 2012/0200763A1
[Patent Literature 2] Korea Unexamined Patent Publication No. 2006-0080821

SUMMARY OF INVENTION

Technical Problem

Accordingly, an objective of the present invention, devised to solve the above described disadvantages and according to the necessity thereof, is to provide a driving control device for VCM and a driving control method for VCM capable of reducing generation of VCM noise at the time of initial driving and landing of the lens of the camera module; and
another objective of the present invention is to provide a driving control device for VCM and a control method thereof for driving control of the VCM so as to minimize the VCM noise and reduce the control time thereof.

Solution to Problem

As a method for controlling the driving of the VCM which moves the lens of a camera module, a driving control method for a VCM according to an exemplary embodiment of the present invention to achieve the above described objectives is characterized by and includes the steps of:
applying a linearly increasing current with a first slope to the VCM up to a pre-set inflection point in response to the camera operation commands; and
moving the lens to the infinite position by applying a linearly increasing current with a second slope less steep than the first slope to the VCM from the inflection point to the infinite position, wherein the first inflection point is set to the value just before the lens start current applied to the VCM when the lens starts from the parking position.
Further, the driving control method for a VCM is characterized by and further includes the steps of:
reducing the VCM noise at the time of lens landing by applying a linearly decreasing current with a third slope to the VCM up to a pre-set second inflection point in response to a camera operation-off command; and
parking the lens by applying a linearly decreasing current with a fourth slope steeper than the third slope to the VCM from the second inflection point to the parking position, wherein the second inflection point is set to the value just after the lens start current.
Also, it is characterized in that the first inflection point or the second inflection point is set between 25% and 50% of the current value applied to the VCM in order to pose the lens to the infinite position; and it is characterized in that the first inflection point or the second inflection point is adjustably set to the lens start current value varying in accordance with the pose of the camera module (i.e. face up, horizontal, and face down), wherein each of the first inflection point or the second inflection point being adjustably set is set to a current value between 25% and 50% of the current value applied to the VCM in order to position the lens to the infinite position.

Meanwhile, a driving control device for a VCM according to another exemplary embodiment of the present invention is characterized in that and comprises:

a control unit generating and outputting a VCM driving control signal for moving the lens of the camera module to an infinite position or a parking position according to the user's camera operation-on command;

a digital-to-analog converter (DAC) for converting the VCM driving control signal into an analog signal; and a motor driving unit for generating a current corresponding to the VCM driving control signal converted into an analog signal and applying it to the VCM, wherein the control unit generates a VCM driving control signal for applying a linearly increasing current with a first slope to the VCM up to a pre-set first inflection point in response to the camera operation-on command, and generates and outputs a VCM driving control signal for applying a linearly increasing current with a second slope which is less steeper than the first slope to the VCM from the first inflection point to the infinite position, and further, the control unit generates a VCM driving control signal for applying a linearly decreasing current with a third slope to the VCM up to a pre-set second inflection point in response to the camera operation-off command, and generates and outputs a VCM driving control signal for applying a linearly decreasing current with a fourth slope which is steeper than the third slope to the VCM from the second inflection point to the parking position.

It is characterized in that each of the first inflection point and the second inflection point is respectively set to the just before value and the value just after the current value applied to the VCM when the lens of the camera module starts from the parking position, and they are being stored in the internal memory of the control unit and utilized, and It is characterized in that the first inflection point or the second inflection point is set to a current value between 25% and 50% of the current value applied to the VCM in order to position the lens to the infinite position.

Advantageous Effects of Invention

According to the above described problem solving means, in the present invention, when the lens is moved from the parking position to the infinite position, it is controlled in a way that a linearly increasing current with a relatively large slope is applied to the VCM up to the current value which is close to the lens start current value (inflection point), and a linearly increasing current with a second slope which is smaller than the first slope is applied to the VCM from the inflection point to the infinite position, so that the time required for moving the lens to the infinite position is reduced, and at the same time, it has a effect of reducing the allophone to VCM.

In similar way, when the lens is being moved to the second inflection point in a way that the linearly decreasing current with a gradual slope is applied thereto, so that the allophone to VCM generated around the lens start current value is reduced, and a linearly decreasing current with a steep slope is applied from the second inflection point to the parking position, thereby bringing the effect of reducing the time required for moving the lens to the parking position.

DETAILED DESCRIPTION OF EMBODIMENT

Hereinafter, an exemplary embodiment of the present invention will be described in detail with reference to the accompanying drawing. In describing the present invention, a detailed description on a relevant publicly known function or a configuration, for example, a publicly known configuration such as a mechanical configuration of a camera module will be omitted.

For reference, the term 'infinite position' among the terms used hereinafter is defined as an initial driving position wherein the lens is positioned after being moved from the parking position when an operating power is supplied to the camera module. In industry, it is common that an infinite position is set to the position of best focus when the object is at 1 meter away from the camera. On the contrary to this, the term 'parking position' is defined as a position where the lens is positioned when the camera is in a stop state. In addition, the term 'camera operation control command' is defined to include camera operation-on command for driving the camera and camera operation-off command for stopping the driving of the camera. Of course, auto focusing, zoom in, and zoom out commands could be one of the control commands. In addition, the term 'lens start current value' is defined as a current value applied to the VCM when a lens starts from the parking position.

Figure 4:
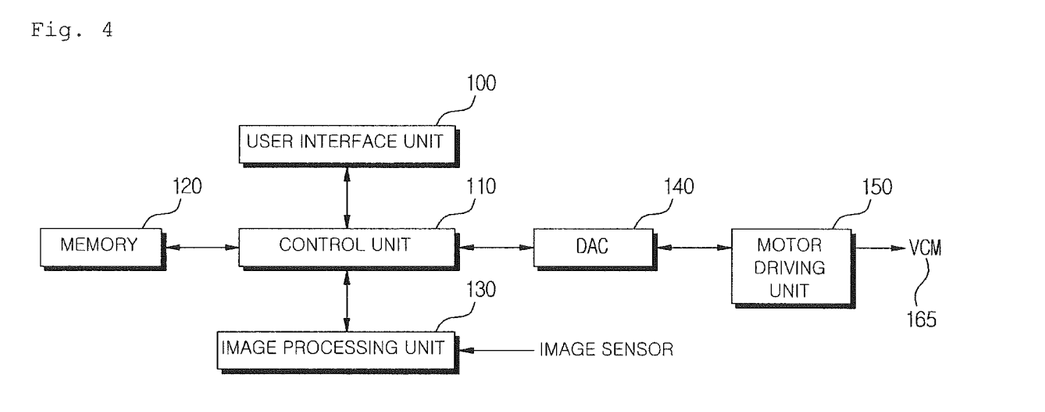
FIG. 4 is an exemplary block diagram of a VCM driving control device according to an exemplary embodiment of the present invention.

First, FIG. 4 is an exemplary block diagram of a VCM driving control device according to an exemplary embodiment of the present invention.

Referring to FIG. 4, a device for controlling the driving of a VCM 165 which moves the lens of a camera module comprises:

a control unit 110 generating and outputting a VCM driving control signal for moving the lens of the camera module to an infinite position or a parking position according to the user's camera operation-on command;

a digital-to-analog converter (DAC) 140 for converting the VCM driving control signal into an analog signal; and a motor driving unit 150 for generating a current i(t) corresponding to the VCM driving control signal converted into an analog signal and applying it to the VCM 165.

The control unit 110 generally controls the operation of a camera module mounted in a device such as a mobile phone and a digital camera according to a user's command inputted via a user interface unit 100, and the control program data for general control of the operation of the camera module is stored in an accessible memory 120.

As an example of such control operation of the control unit 110, in order to minimize the generation of VCM noise, the control unit 110 generates a VCM driving control signal for applying a linearly increasing current with a first slope to the VCM 165 up to a pre-set first inflection point (P1 of FIG. 6a) in response to the camera operation-on command, and generates and outputs a VCM driving control signal for applying a linearly increasing current with a second slope less steep than the first slope to the VCM 165 from the first inflection point (P1 of FIG. 6a) to an infinite position.

Also, the control unit 110 generates a VCM driving control signal for applying a linearly decreasing current with a third slope to the VCM 165 up to a pre-set second inflection point (P2 of FIG. 6b) in response to the camera operation-off command, and generates and outputs a VCM driving control signal for applying a linearly decreasing current with a fourth slope steeper than the third slope to the VCM 165 from the second inflection point (P2 of FIG. 6b) to a parking position.

Figure 6A:
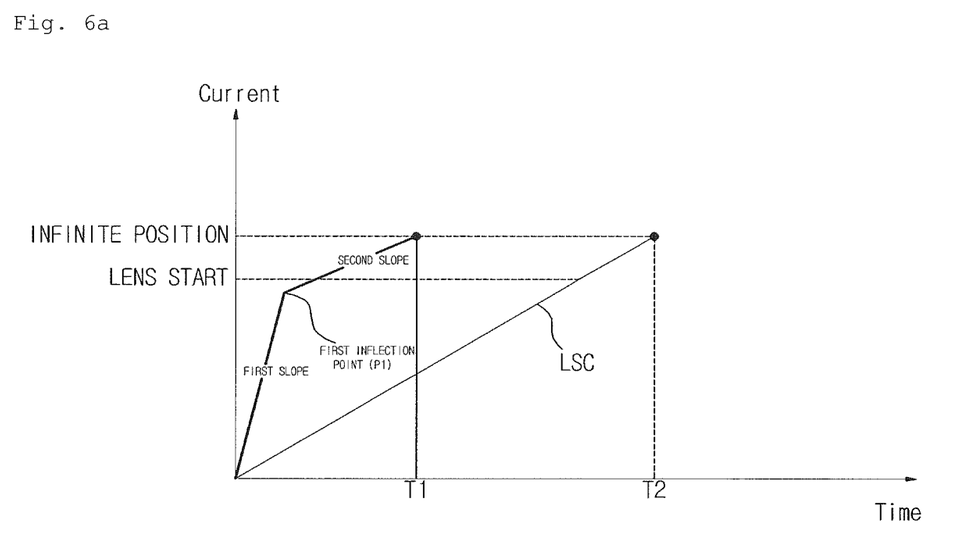
FIGS. 6a and 6b are the exemplary graphs plotting the current applied to VCM versus the displacement of the lens according to an exemplary embodiment of the present invention.
Figure 6B:
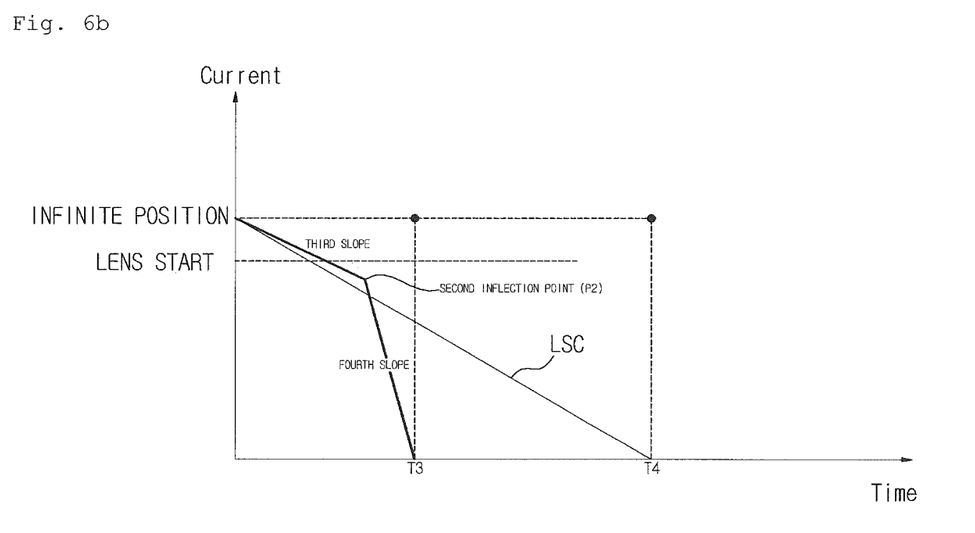

For reference, the first inflection point P1 is set to the value just before the lens start current, and the second inflection point P2 is set to the value just after the lens start current (when the lens is landing)(preferably set to a current value between 25% and 50% of the current value applied to VCM for positioning the lens to the infinite position) of the current applied to the VCM 165 (can be obtained through the experiments) when the lens of the camera module starts from the parking position, and they can be stored in a memory 120 or an internal memory or a register of the control unit 110 and utilized. The first inflection point P1 and the second inflection point P2 can be set to a same current value, however, can have different current value depending on the mechanical and operational characteristics of each camera module. What is important is that the lens start current is varying depending on the pose (face up, horizontal, and face down) of the camera module due to the gravity, stopping friction, and the like. Accordingly, the first inflection point P1 and the second inflection point P2 are adjustably set to the lens start current value varying with the position of the camera module, wherein each of the first inflection point and the second inflection point can be respectively set to a current value between 25% and 50% of the current value applied to the VCM for positioning the lens to the infinite position.

The user interface unit 100 in FIG. 4, which has not been described yet, comprises manipulating buttons for inputting the user commands depending on devices, and in some cases, a display unit may further be included for displaying captured images and the operating state of the devices.

In the memory 120, the control program data is stored for controlling the driving of the camera module, and the information on the inflection points P1 and P2 obtained through the experiments is stored as well.

The image signal processing unit 130 processes the image signal obtained from the image sensor constituting the camera module. Generally, the image sensor is disposed in the lower portion of the lens of the camera module.

The mechanical configuration of the camera module is additionally explained with reference to FIG. 1 as follows. FIG. 1 illustrates a state of a voice coil actuator (VCA) 12 wherein the lens is being moved to the bottom surface (parking position). In FIG. 1, the lens driving unit comprises a VCA 12, a spring 19, and a housing 13. The VGA 12 plays the role of moving the lens 11 in a straight line along the optical axis, and comprises a bobbin 12A and a permanent magnet 12B. The bobbin 12A is coupled to the side surface of the lens 11 and wound with a coil (not shown). The bobbin 12A adjusts the position of the lens 11 depending on the amount of the current flowing through the coil. The permanent magnet 12B is disposed in the outer side of the bobbin 12A. The lower end portion 12C of the bobbin 12A maintains a gap h with respect to the bobbin support portion 14 of the housing 13 while the camera module 10 is taking pictures. The gap h between the lower end portion 12C of the bobbin 12A and the bobbin support portion 14 is same as the gap between the lower surface of the lens 11 and the bottom surface 16. The spring 19 plays the role of moving the lens 11 to the bottom surface 16 when the power of the camera is off, and comprises an upper spring 19A disposed in the upper side of the VCA 12 and a lower spring 19B disposed in the lower side of the VCA 12. The housing 13 plays the role of protecting and supporting the internal elements of the camera module 10 by encasing them, and includes the bobbins support portion 14 and the lower end support portion 15 of the lens. The upper surface of the lower end support portion 15 of the lens forms a bottom surface 16 being contacted with the lens 11 when the power supply of the camera is off. Among such elements of the camera module, the VCA 12 which moves the lens 11 will be named collectively as VCM 165 for the convenience sake of explanation, and the bottom surface 16 will be named as a parking position.

Hereinafter, the operation of a VCM driving control device having the above described configuration will be described in detail with reference to the accompanying drawings as follows.

Figure 5:
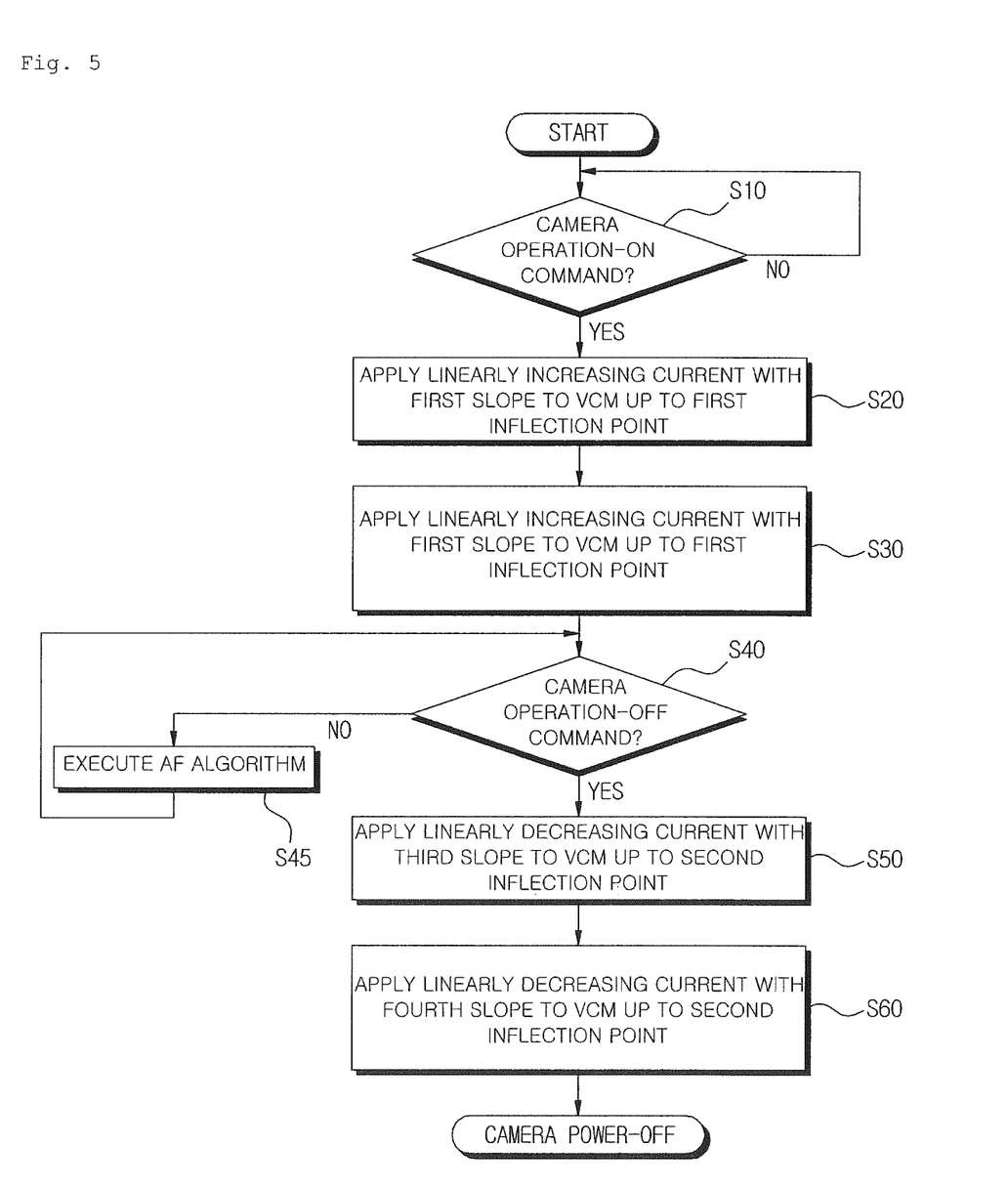
FIG. 5 is an exemplary flow diagram of VCM driving control according to an exemplary embodiment of the present invention.

FIG. 5 is an exemplary flow diagram of VCM driving control according to an exemplary embodiment of the present invention, and FIGS. 6a and 6b respectively illustrate the graphs plotting the current applied to VCM versus the displacement of the lens according to an exemplary embodiment of the present invention. Hereinbelow, for the convenience sake of explanation, the exemplary embodiment of the present invention will be explained assuming that the camera module is in a horizontal state. By using a first inflection point P1 and a second inflection point P2 which are respectively mapped to a lens start current value obtained in the horizontal state, and a lens start current value obtained in the horizontal state, a method for controlling the driving of the VCM 165 will be described.

Referring to FIG. 5, first, in a state wherein the operating power is turned off, the lens 110 of the camera module is located in the bottom surface 16, which is a parking position. If the camera operation-on command is received (step S10)

through the user interface unit 100, the control unit 110 moves the lens 11 to the infinite position, which is an initial driving position.

For this operation, the control unit 110, as illustrated in FIG. 6a, applies a linearly increasing current with a first slope to the pre-set first inflection point P1 to the VCM 165 (step S20). The first inflection point P1 is set to the just before value (preferably, set to a current value between 25% and 50% of the current value applied to VCM for positioning the lens to the infinite position) of the current applied to the VCM (can be obtained through the experiments) when the lens 11 starts by the applied current. For reference, the first inflection point P1 has a digital code value corresponding to the current value applied to the VCM 165, and this will be named as the current value for the convenience sake of explanation.

The reason why the first inflection point P1 is set to the value just before the lens start current is to reduce the moving time to the infinite position by driving the lens initially, and minimize the VCM noise as well. That is, as illustrated in FIG. 6a, if the current applied to the VCM is linearly increased one code per step like the slope of the linear slope control (LSC) of the prior art, the VCM noise is reduced, however, the moving time to the infinite position is delayed. In this point of view, in the present invention, the initial driving time of the lens is reduced in a way that the applied current is rapidly and linearly increased (for example, 5 codes per step)(LSC1) up to the first inflection point P1 just before the lens start current in the horizontal state.

In this way, after it is controlled in a way that a linearly increasing current with a first slope is applied to the VCM 165 up to the first inflection point P1, the control unit 110 applies a linearly increasing current with a second slope which is less steeper than the first slope to the VCM 165 (step S30) from the first inflection point P1, and moves the lens to the infinite position which is its initial driving position. The linearly increasing current i(t) with the second slope should be set to include the lens start current value, and should be set to have a linearly increasing slope so that the VCM noise is minimized.

In this way, it is controlled in a way that a linearly increasing current with a first slope relatively steeper is applied to the VCM 165 up to the just before current value (inflection point P1) which is close to the lens start current value, and if it is controlled in a way that a linearly increasing current with a second slope less steeper than the first slope is applied to the VCM 165 from the inflection point P1 to the infinite position, then the time required to move the lens to the infinite position can be reduced from T2 of the prior art to T1 as shown in FIG. 6a, and the VCM noise can be minimized by applying a gradually and linearly increasing current.

Meanwhile, when a camera operation-off command of a user is received (step S40) while operating a camera, the control unit 110 controls, in response to the camera operation-off command, in a way that a linearly decreasing current with a third slope (one code per step) is applied to the VCM 165 (step S50) from a pre-set second inflection point P2 as illustrated in FIG. 6b. The second inflection point P2 may have same value as the first inflection point P1, and also may have a different value than that of the first inflection point P1 but has a current value smaller than the lens start current value. These are the values that can be obtained through the experiments. The key point is that the first inflection point P1 and the second inflection point P2 should be set to the just before value of the current (preferably set to a value between 25% and 50% of the current value applied to VCM for positioning the lens to the infinite position) which is smaller than the lens start current value in order to reduce the VCM noise generated by the lens start current value.

As described above, after it is controlled in a way that a linearly decreasing current with a third slope is applied to the VCM 165 up to the second inflection point P2, the control unit 110 parks the lens by controlling in a way that a linearly decreasing current with a fourth slope which is steeper (5 codes per step) than the third slope is applied to the VCM 165 (step S60) from the second inflection point P2 to the parking position, as illustrated in FIG. 6b.

In this way, the VCM noise is minimized by controlling in a way that a linearly decreasing current with a slope relatively less steep is applied to the VCM 165 up to the current value which is close to the lens start current value (inflection point P3), and it is controlled in a way that a rapidly and linearly decreasing current with a fourth slope steeper than the third slope is applied to the VCM 165 from the inflection point P2 to the parking position so that the moving time to the parking position can be reduced from T4 of the LSC of the prior art to T3.

In addition, if it is controlled in a way that a linearly decreasing current is applied to the VCM 165 from the inflection point P2 to the parking position, the noise due to the collision between the lens and the bottom surface which may occur when the power is turned off without a gradual decrease in the applied current.

Figure 7:
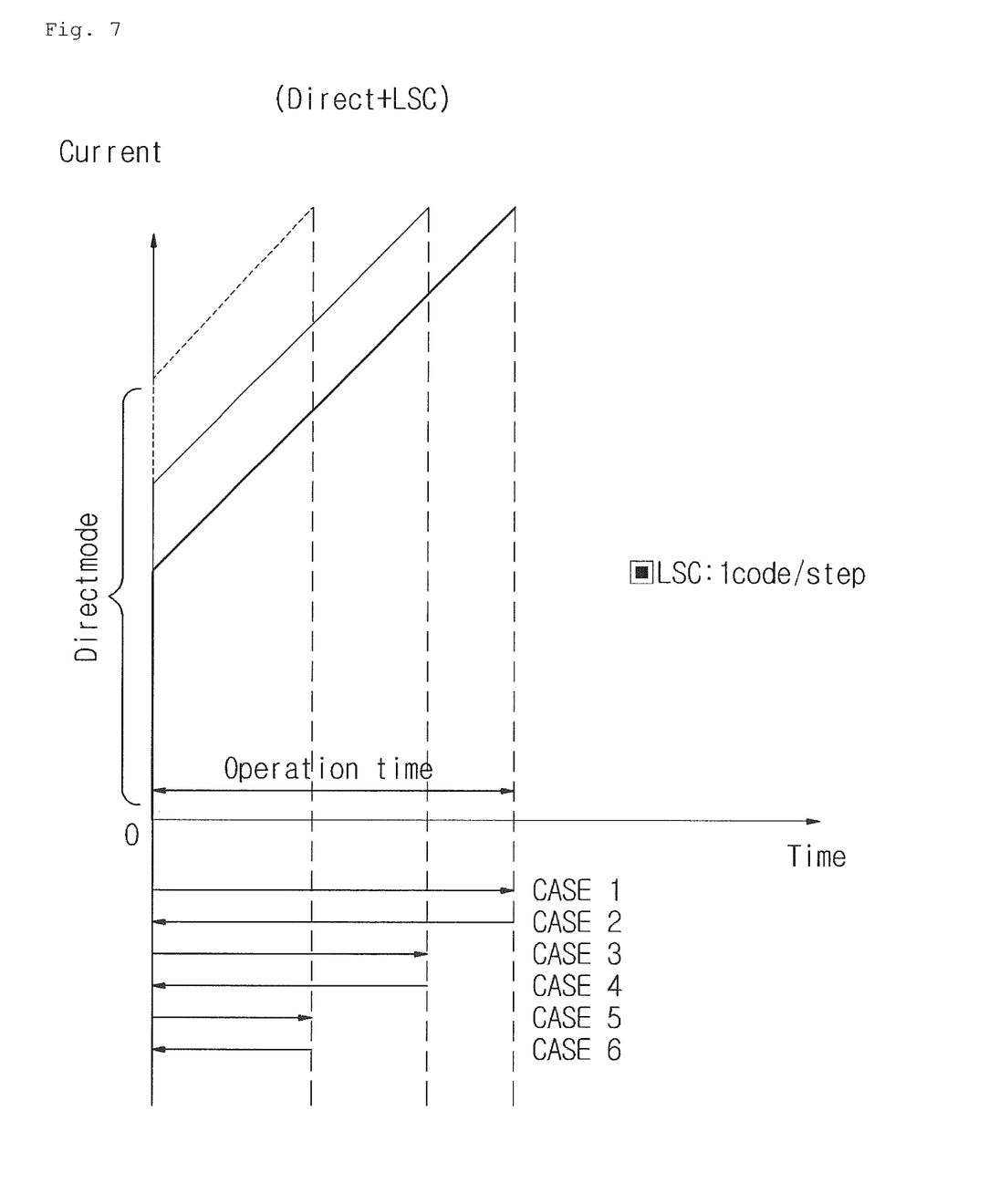
FIG. 7 is an exemplary timing diagram of the currents applied directly to VCM in response to camera operation-on command according to the prior method.
Figure 8:
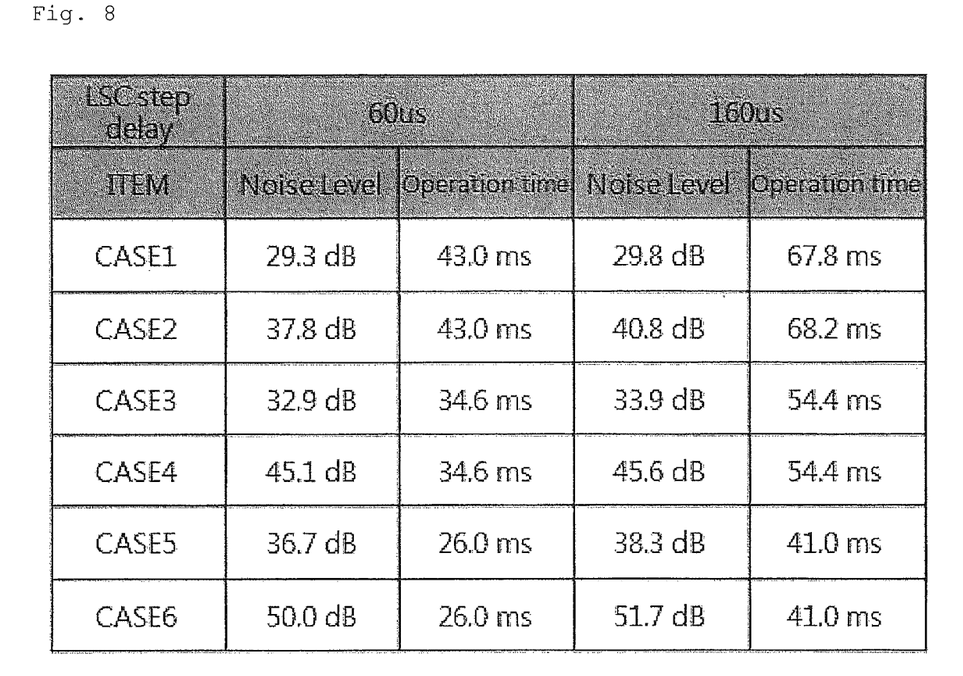
FIG. 8 is an exemplary noise measurement results based on FIG. 7.
Figure 9:
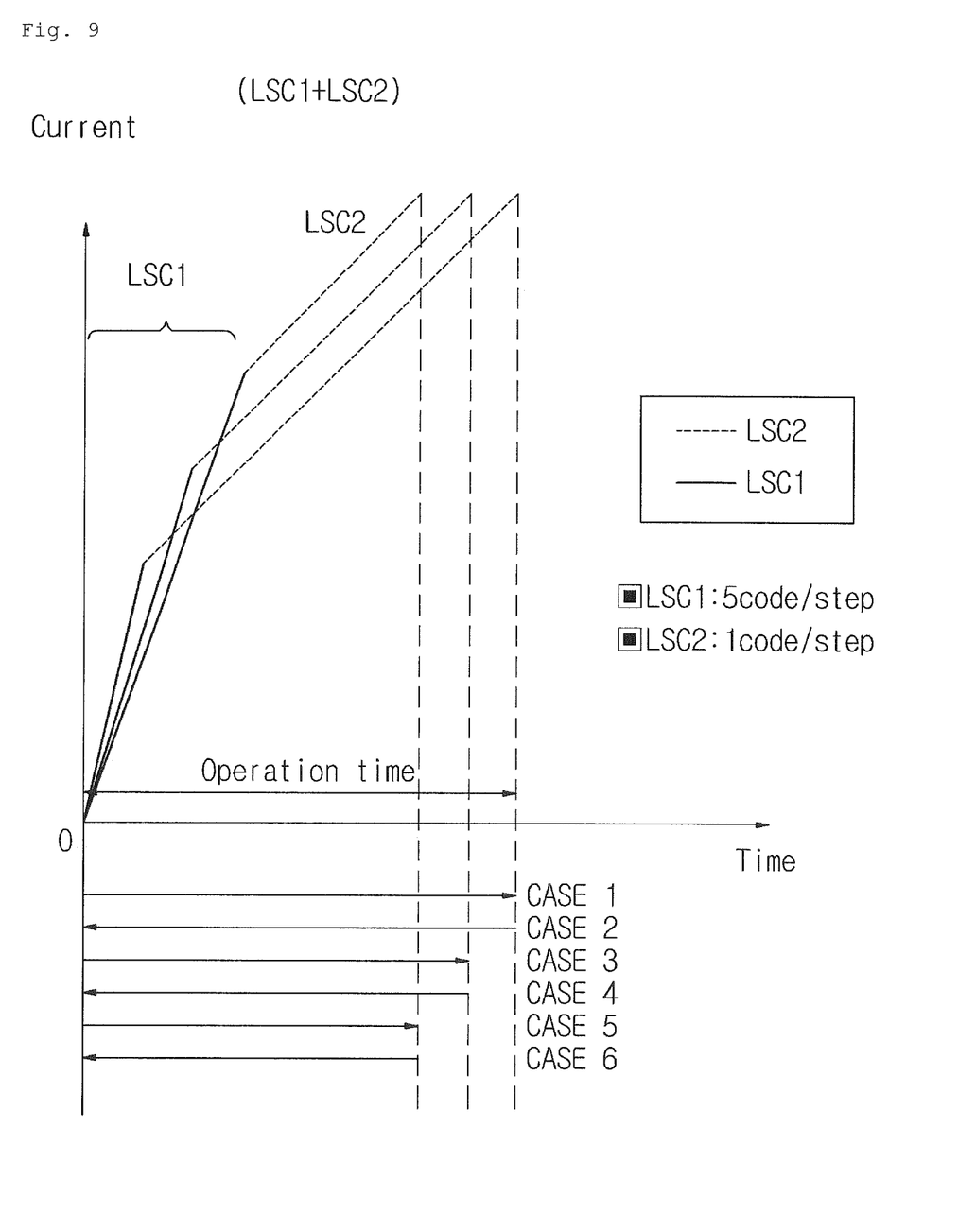
FIG. 9 is an exemplary timing diagram of the currents applied according to an exemplary embodiment of the present invention.
Figure 10:
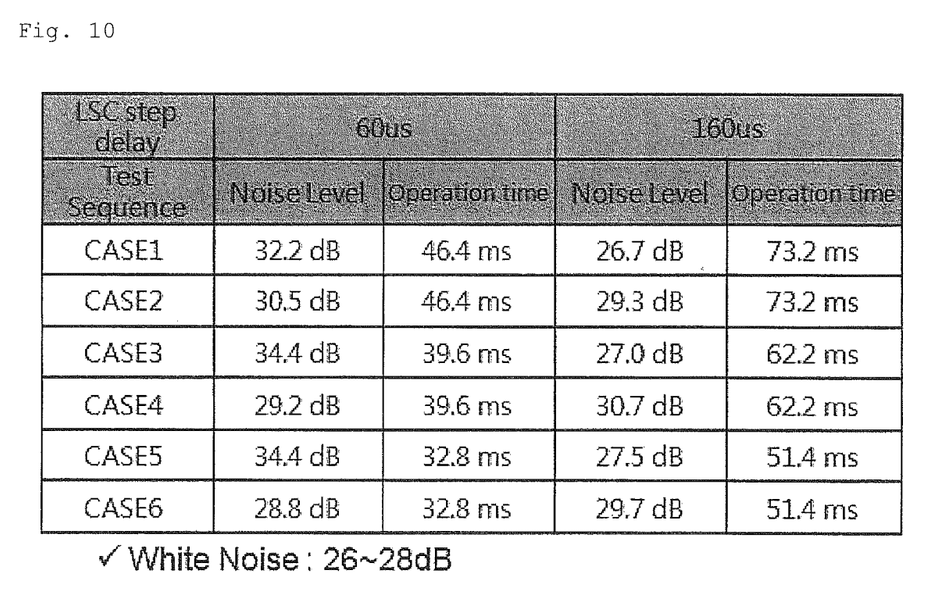
FIG. 10 is an exemplary noise measurement results based on FIG. 9.

FIG. 7 is an exemplary timing diagram of the currents applied directly to VCM in response to camera operation-on command according to the prior method; FIG. 8 is an exemplary noise measurement results based on FIG. 7; FIG. 9 is an exemplary timing of the currents applied according to an exemplary embodiment of the present invention; and FIG. 10 is an exemplary noise measurement results based on FIG. 9.

When comparing FIGS. 7 and 9, unlike the way shown in FIG. 7 wherein the current is directly applied to the VCM in response to the camera operation-on command as shown in FIG. 7, FIG. 9 illustrates a timing diagram for applying current according to a control method wherein a current with a first slope is rapidly and linearly applied to the VCM up to a first inflection point obtained from the experiment as shown in FIG. 9, and a linearly increasing current with a second slope is applied to the VCM from the first inflection point to the infinite position, wherein the second slope is less steep than the first slope.

The measurement results when the currents are applied to the VCM according to the method illustrated in FIGS. 7 and 9 are exemplarily shown in FIGS. 8 and 9 respectively. By comparing the tables in FIGS. 8 and 10, it can be seen that the VCM noise of the case wherein the driving of the VCM is controlled according to an exemplary embodiment of the present invention is relatively reduced than that of the case controlled by a direct method.

Therefore, the present invention can be considered as an invention wherein the VCM noise is reduced when compared to the method wherein the current is directly applied to the VCM, and it is a useful invention capable of reducing the moving time required for moving the lens to the infinite position when compared to the method of the prior art wherein a gradually and linearly increasing current is applied to the VCM in response to the camera operation-on command.

As described above, although it is described with reference to the illustrated exemplary embodiments of the present invention, these are merely exemplary embodiments and it will be apparent to any person of ordinary skill in the art that various modifications and equivalent other exemplary embodiments are possible from these. Accordingly, the true scope of protection of the present invention must be determined by the scope of the attached claims.

What is claimed is:

1. A method for controlling the driving of a voice coil motor (VCM) which moves a lens of a camera module comprising:
   applying a linearly increasing current with a first slope to said VCM up to a pre-set first inflection point in response to a camera operation-on command; and
   moving the lens from a parking position to an infinite position by applying a linearly increasing current with a second slope less steep than said first slope to said VCM from said first inflection point to the infinite position,
   wherein said first inflection point is set to a value just before a lens start current that is applied to the VCM when the lens starts from the parking position.

2. The method for controlling the driving of the VCM according to claim 1,
   further comprising:
   reducing the VCM noise at the time of lens landing by applying a linearly decreasing current with a third slope to said VCM up to a pre-set second inflection point in response to a camera operation-off command; and
   parking the lens by applying a linearly decreasing current with a fourth slope steeper than the third slope to said VCM from said second inflection point to the parking position,
   wherein said second inflection point is set to a value just after said lens start current.

3. The method for controlling the driving of the VCM according to claim 1,
   wherein said first inflection point and said second inflection point is set to a current value between 25% and 50% of the current value applied to the VCM in order to position the lens to the infinite position.

4. The method for controlling the driving of the VCM according to claim 2,
   wherein said first inflection point and said second inflection point is adjustably set to the lens start current value varying in accordance with the pose of the camera module (face up, horizontal, and face down), wherein each of said first inflection point or said second inflection point being adjustably set is set to a current value between 25% and 50% of the current value applied to the VCM in order to position the lens to the infinite position.

5. The method for controlling the driving of the VCM according to claim 1,
   wherein said first inflection point is set to a current value between 25% and 50% of the current value applied to the VCM in order to position the lens to the infinite position.

6. The method for controlling the driving of the VCM according to claim 1,
   wherein said first inflection point is adjustably set to the lens start current value varying in accordance with the pose of the camera module (face up, horizontal, and face down), wherein said first inflection point being adjustably set is set to a current value between 25% and 50% of the current value applied to the VCM in order to position the lens to the infinite position.

7. A device for controlling the driving of a voice coil motor (VCM) characterized by and comprising:
   a controller generating and outputting a VCM driving control signal for moving the lens of a camera module to an infinite position or a parking position according to a user's camera operation-on command;
   a digital-to-analog converter (DAC) for converting said VCM driving control signal into an analog signal; and
   a motor driver for generating a current corresponding to said VCM driving control signal converted into an analog signal and applying it to said VCM,
   wherein said controller generates a VCM driving control signal for applying a linearly increasing current with a first slope to said VCM up to a pre-set first inflection point in response to a camera operation-on command; and generates and outputs a VCM driving control signal for applying a linearly increasing current with a second slope less steep than said first slope to the VCM from said first inflection point to an infinite position.

8. The device for controlling the driving of the VCM according to claim 7,
   wherein said controller generates a VCM driving control signal for applying a linearly decreasing current with a third slope to said VCM up to a pre-set second inflection point in response to a camera operation-off command; and generates and outputs a VCM driving control signal for applying a linearly decreasing current with a fourth slope steeper than said third slope to said VCM from said second inflection point to a parking position.

9. The device for controlling the driving of the VCM according to claim 7,
   wherein said first inflection point is set to the value just before the current applied to the VCM when the lens of the camera module starts from the parking position, and stored in the internal memory of said controller and utilized.

10. The method for controlling the driving of the VCM according to claim 7,
    wherein said first inflection point is set to a current value between 25% and 50% of the current value applied to the VCM in order to position the lens to the infinite position.

11. The device for controlling the driving of the VCM according to claim 7,
    wherein said first inflection point is adjustably set to the lens start current value varying in accordance with the pose of the camera module (face up, horizontal, and face down), wherein said first inflection point being adjustably set is set to a current value between 25% and 50% of the current value applied to the VCM in order to position the lens to the infinite position.

12. The device for controlling the driving of the VCM according to claim 8,
    wherein said second inflection point is set to the value just after the current applied to the VCM when the lens of the camera module starts from the parking position, and stored in the internal memory of said controller and utilized.

13. The device for controlling the driving of the VCM according to claim 8,
    wherein said second inflection point is set to a current value between 25% and 50% of the current value applied to the VCM in order to position the lens to the infinite position.

14. The device for controlling the driving of the VCM according to claim 8,
    wherein said second inflection point is adjustably set to the lens start current value varying in accordance with the pose of the camera module (face up, horizontal, and face down), wherein said second inflection point being adjustably set is set to a current value between 25% and 50% of the current value applied to the VCM in order to position the lens to the infinite position.

\* \* \* \* \*